(12) United States Patent
Wu

(10) Patent No.: US 9,153,850 B2
(45) Date of Patent: Oct. 6, 2015

(54) BATTERY PACK WITH A HEAT DISSIPATION STRUCTURE

(71) Applicant: ENERGY CONTROL LIMITED, Tortola (VG)

(72) Inventor: Donald P. H. Wu, Hsinchu County (TW)

(73) Assignee: ENERGY CONTROL LIMITED, Tortola (VG)

( * ) Notice: Subject to any disclaimer, the term of this patent is extended or adjusted under 35 U.S.C. 154(b) by 393 days.

(21) Appl. No.: 13/738,925

(22) Filed: Jan. 10, 2013

(65) Prior Publication Data

US 2013/0122340 A1    May 16, 2013

Related U.S. Application Data

(63) Continuation-in-part of application No. 12/950,084, filed on Nov. 19, 2010.

(51) Int. Cl.
| | |
|---|---|
| *H01M 10/60* | (2014.01) |
| *H01M 10/613* | (2014.01) |
| *H01M 2/10* | (2006.01) |
| *H01M 10/6551* | (2014.01) |
| *H01M 10/6555* | (2014.01) |
| *H01M 10/643* | (2014.01) |

(52) U.S. Cl.
CPC ........ *H01M 10/5004* (2013.01); *H01M 2/1016* (2013.01); *H01M 10/613* (2015.04); *H01M 10/643* (2015.04); *H01M 10/6551* (2015.04); *H01M 10/6555* (2015.04); *H01M 2/105* (2013.01); *H01M 2/1077* (2013.01)

(58) Field of Classification Search
CPC ...................................................... H01M 10/50
See application file for complete search history.

(56) References Cited

U.S. PATENT DOCUMENTS

2010/0255360 A1* 10/2010 Umemoto et al. ............ 429/120

* cited by examiner

*Primary Examiner* — Jacob Marks
(74) *Attorney, Agent, or Firm* — Patent Office of Bang Shia

(57) ABSTRACT

A battery pack with a heat dissipation structure comprises two battery modules, four heat dissipation elements, and four spacing sleeves that are combined by four screws. The four heat dissipation elements and the four spacing sleeves are disposed between the two battery modules. The dissipation elements are in direct contact with the respective battery modules, so that the heat of the respective battery module will be conducted to the heat dissipation plates then dissipated into the air through the heat dissipation fins of the heat dissipation plates. Between the two battery modules is formed a heat dissipation channel, which can avoid the heat accumulation due to direct contact of the two battery modules while allowing the hot air in the heat dissipation channel to be exchanged to the cool air outside the battery pack.

1 Claim, 7 Drawing Sheets

BATTERY PACK WITH A HEAT DISSIPATION STRUCTURE

This application is a continuation in part of U.S. patent application Ser. No. 12/950,084, now pending, which claims the benefit of the earlier filing date of Nov. 19, 2010. Claim 1 of this application is revised from claim 1 of the U.S. patent application Ser. No. 12/950,084.

BACKGROUND OF THE INVENTION

1. Field of the Invention

The present invention relates to a battery pack, and more particularly to a battery pack with a heat dissipation structure.

2. Description of the Prior Art

Referring to FIG. 1, a conventional battery pack 10 disclosed in U.S. Pub. No. 20070037051 comprises plural battery cells 11, and plural spacers 12 arranged between the respective battery cells 11. Each of the spacers 12 is formed with plural concavo-convex structures 13, so that plural air channels 14 will be formed after the respective battery cells 11 and the spacers 12 are assembled, facilitating the heat dissipation of the battery pack 10.

It is to be noted that, the heat dissipation structure of the above battery pack 10, which is formed by arranging one spacer between each two neighboring battery cells, has a bad heat dissipation effect for the following reasons:

1. After the assembly of the battery pack 10, the surface of the spacer 12, which is formed with the concavo-convex structure 13, covers one surface of the battery cell 11 and cannot be directly exposed, making the dissipation of the heat difficult.

2. After the assembly of the battery pack 10, the air channels 14 formed by the plural concavo-convex structures 13 are not in communication with each other, and an external opening of the respective air channels 14 is quite narrow, so that the air is difficult to circulate, leading to the accumulation of the heat.

FIG. 2 shows another conventional battery pack 10' disclosed in U.S. Pub. No. 2010/0255360A1, wherein the battery pack 10' comprises a plurality of battery modules 1 which are closely arranged side by side. The disadvantage of this conventional battery pack 10' is that the battery modules 1 are rested against one another, leaving no space between the battery modules 1, which is not good for heat dissipation. Besides, the heat dissipation elements 9 are just disposed on the outer surface of the battery pack 10' (namely, on the lateral surface of the battery modules 1) without inserting inside the battery pack 10'. Hence, the heat dissipation elements 9 are only capable of dissipating the heat generated from the outer surface of the battery pack but are unable to dissipate the heat generated inside the battery pack 10'. Therefore, the heat dissipation of this conventional battery pack 10' is not good.

U.S. Pub. No. 2010/0247999A1 also disclosed a conventional battery pack which also suffers from the same disadvantage as the above-mentioned battery pack 10'.

The present invention has arisen to mitigate and/or obviate the afore-described disadvantages.

SUMMARY OF THE INVENTION

The primary objective of the present invention is to provide a battery pack with a heat dissipation structure which comprises two battery modules spaced by a distance, avoiding the heat accumulation due to direct contact of the two battery modules, in addition between the two battery modules is formed a heat dissipation channel, allowing the hot air in the heat dissipation channel to be smoothly exchanged with the cool air outside the battery pack, cooling down the temperature.

The secondary objective of the present invention is to provide a battery pack with a heat dissipation structure in which heat dissipation fins are collectively disposed on the left surfaces and the right surfaces of the respective battery modules, not only avoiding the heat accumulation in the inner surface but also facilitating the space arrangement of the battery pack when in use, for example, the heat dissipation fins can be arranged toward a place with better ventilation.

To achieve the above objectives, a battery pack with a heat dissipation structure in accordance with the present invention comprises:

at least two battery modules each including plural battery cells that are electrically connected in a rectangular frame, the frame including an inner surface, an outer surface, a left surface and a right surface, each of the battery cells having a side surface exposed out of the inner surface of the frame, the frame being further formed with a through hole in each of four corners thereof;

at least four heat dissipation elements disposed between the battery modules and each being provided with a plane plate, the plane plate being provided with a locking hole at each of two opposite ends thereof; and at least four screws being inserted through the through holes of a first battery module of the at least two battery modules, the locking holes of the heat dissipation element, and the through holes of a second battery module of the at least two battery module in order and then screwed with nuts.

The battery pack is characterized in that: the plane plate of each of the heat dissipation elements includes a channel surface and a contact surface that are opposite each other, the contact surface is provided with a heat dissipation plate which is perpendicular to the contact surface, the heat dissipation plate is formed with plural spaced fins on an outer surface thereof, the contact surface of each of the heat dissipation elements is brought into contact with the side surfaces of the battery cells exposed out of the inner surface of the frame, so that the heat dissipation plates are positioned against the left side surfaces or the right side surfaces of the battery modules, and each of the battery modules is brought into contact with two of the four heat dissipation elements simultaneously, between each of the locking holes of one of the two battery modules and a corresponding one of the locking holes of another of the two battery modules is disposed a spacing sleeve which is sleeved onto the screws, namely, the spacing sleeves are located between the channel surfaces of the heat dissipation elements, so that one of the battery modules and the two of the battery heat dissipation elements that are brought into contact with the one of the battery modules are spaced a distance from another one of the two battery modules and another two of the battery heat dissipation elements that are brought into contact with the another one of the battery modules, and the distance forms a heat dissipation channel between the two battery modules, so that heat generated by the battery cells of the respective battery modules is allowed to be dissipated into the heat dissipation channel by the heat dissipation elements or dissipated outside the battery modules by the fins of the heat dissipation plate.

DETAILED DESCRIPTION OF THE PREFERRED EMBODIMENTS

Figure 1:
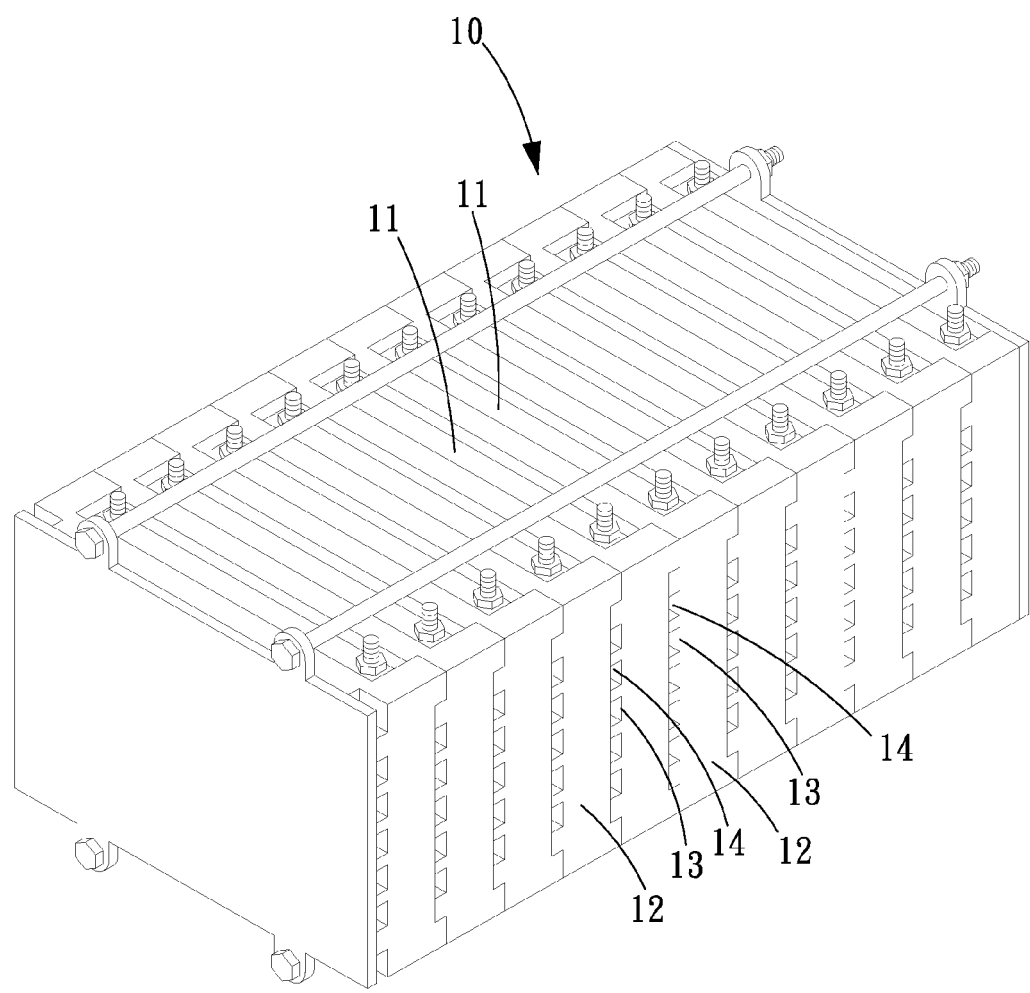
FIG. 1 is a perspective view of a conventional battery pack.
Figure 2:
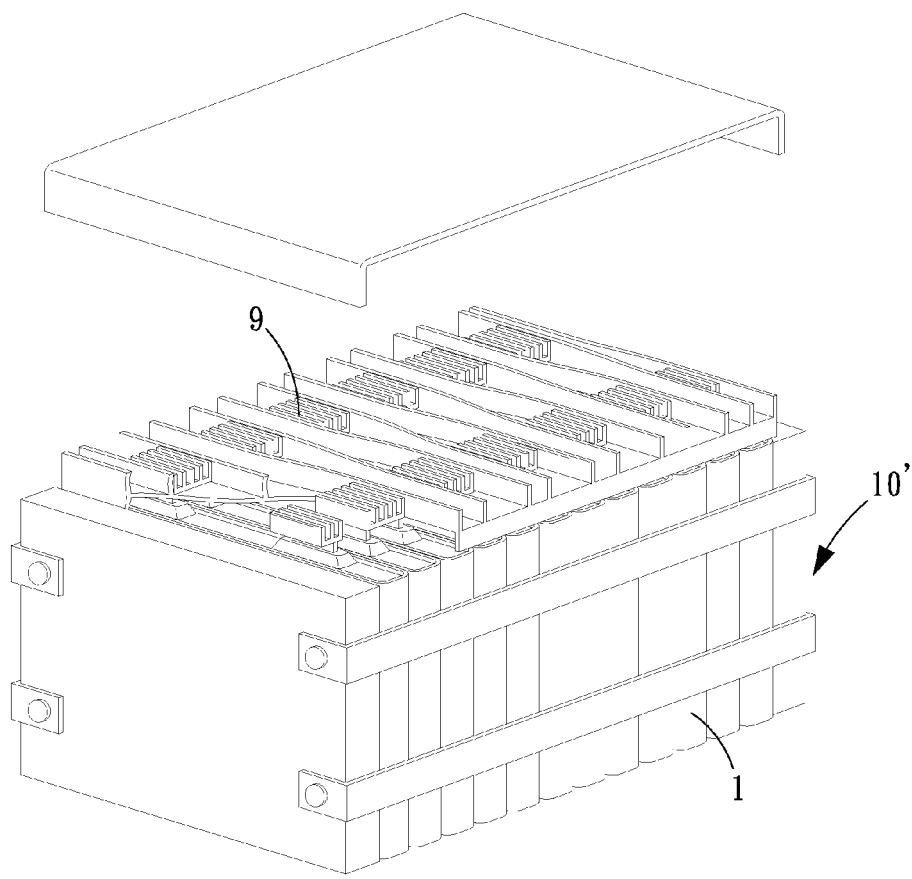
FIG. 2 is a perspective view of another conventional battery pack.
Figure 3:
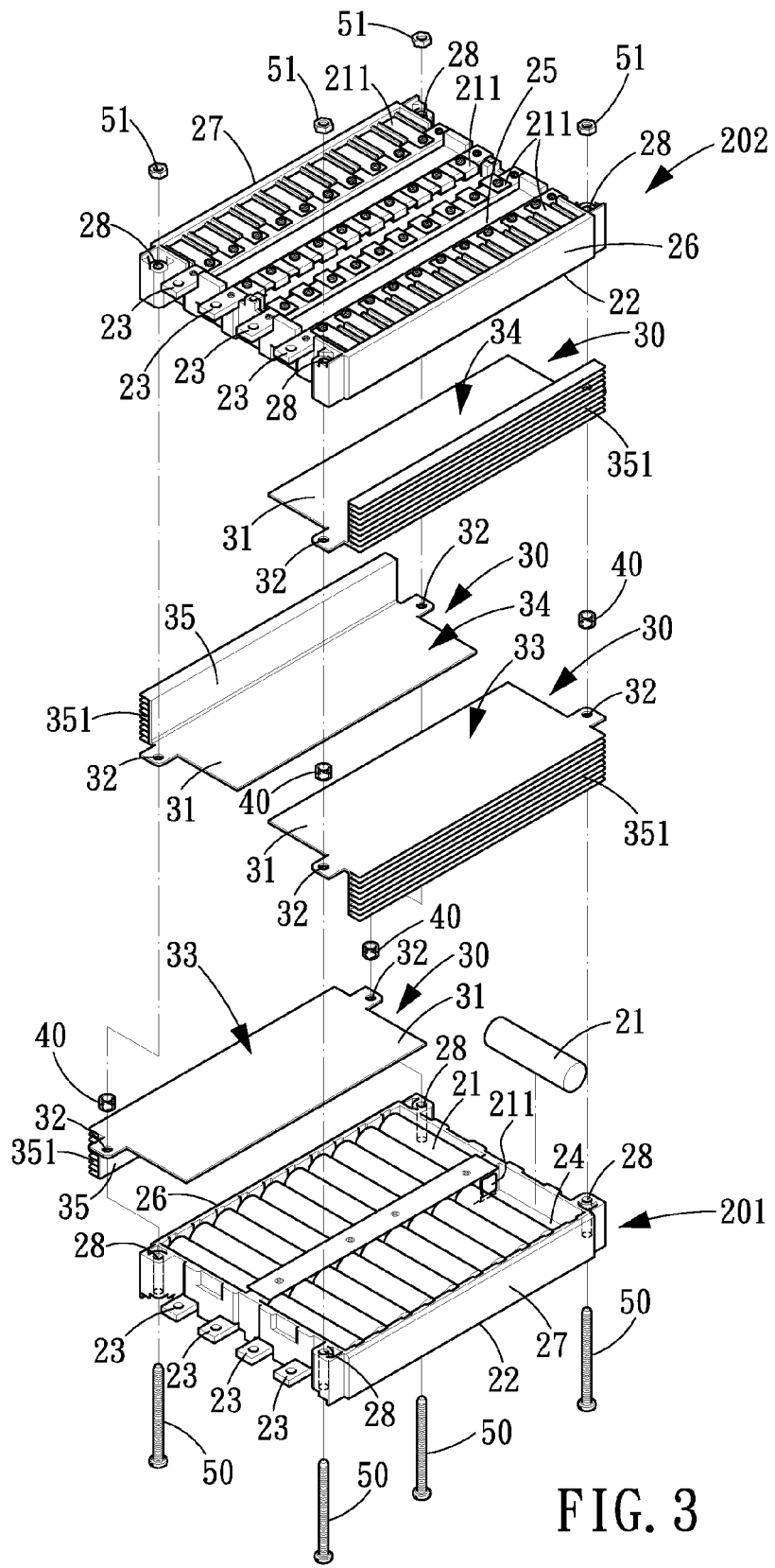
FIG. 3 is an exploded view of a battery pack with a heat dissipation structure in accordance with the present invention.

The present invention will be clearer from the following description when viewed together with the accompanying drawings, which show, for purpose of illustrations only, the preferred embodiment in accordance with the present invention.

Referring to FIGS. 3-6, a battery pack with a heat dissipation structure in accordance with the present invention comprises two battery modules 201, 202, four heat dissipation elements 30, four spacing sleeves 40 that are combined by four screws 50, and the four heat dissipation elements 30 and the four spacing sleeves 40 are disposed between the two battery modules 201, 202.

Each of the battery modules 201, 202 includes plural battery cells 21 that are electrically connected through metal connecting strips 211 in a rectangular frame 22 and have common output terminals 23. The frame 22 includes an inner surface 24, an outer surface 25, a left surface 26 and a right surface 27. Each of the battery cells 21 has a side surface exposed out of the inner surface 24 of the frame 22. The frame 22 is further formed with a through hole 28 in each of four corners thereof.

Each of the heat dissipation elements 30 is made of metal and provided with a plane plate 31. The plane plate 31 is provided with a locking hole 32 at each of two opposite ends thereof. The plane plate 31 further includes a channel surface 33 and a contact surface 34 that are opposite each other. The contact surface 34 is provided with a heat dissipation plate 35 which is perpendicular to the contact surface 34. The heat dissipation plate 35 is formed with plural spaced fins 351 on an outer surface thereof. The contact surfaces 34 of the heat dissipation elements 30 are brought into contact with the side surfaces of the battery cells 21 exposed out of the inner surface 24 of the frame 22. The heat dissipation plates 35 are positioned against the left side surfaces 26 and the right side surfaces 27 of the battery modules 201, 202, so that each of the battery modules 201, 202 is brought into contact with two of the four heat dissipation elements 30 simultaneously. The locking holes 32 of the heat dissipation elements 30 are aligned with the respective through holes 28 of the frame 22.

The spacing sleeves 40 are disposed in alignment with the respective locking holes 32 of the heat dissipation elements 30.

After being inserted through the through holes 28 of the battery module 201, the locking holes 32 of the heat dissipation element 30, the spacing sleeves 40, and the through holes 28 of the battery module 202 in order, the respective screws 50 will be screwed with a nut 51, so that the two channel surfaces 33 between the two battery modules 201, 202 are spaced by a distance, forming a heat dissipation channel 60, and therefore the heat generated by the battery cells 21 of the respective battery modules 201, 202 can be dissipated into the heat dissipation channel 60 by the heat dissipation elements 30 or dissipated outside the battery modules 201, 202 by the fins 351 of the heat dissipation plate 35.

The aforementioned is the summary of the positional and structural relationship of the respective components of the preferred embodiment in accordance with the present invention.

For a better understanding of the present invention, its operation and function, reference should be made to FIGS. 3-6:

The heat of the battery pack is released from the surfaces of the respective battery cells 21, and the contact surfaces 34 of the heat dissipation elements 30 are in direct contact with the side surfaces of the respective battery cells 21, so that the heat of the respective battery cells 21 is conducted to the heat dissipation plates 35 and then dissipated into the air through the heat dissipation fins 351 of the heat dissipation plates 35.

Figure 6:
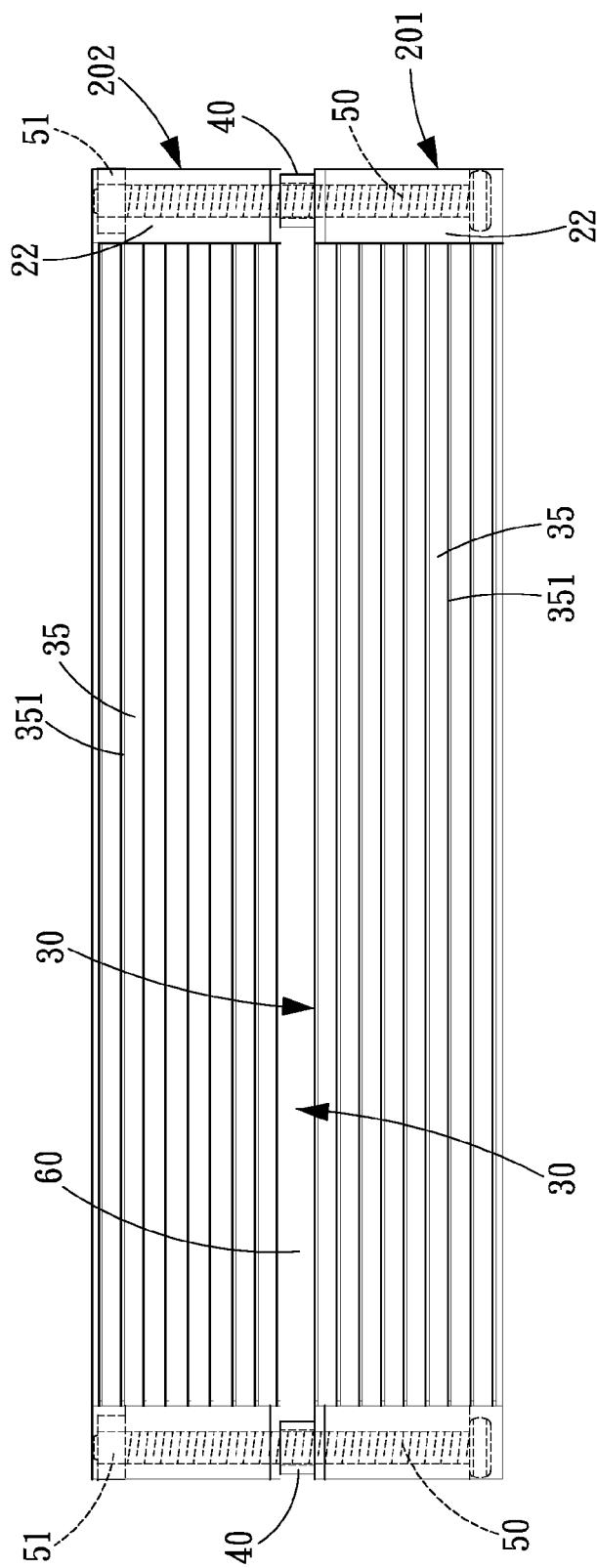
FIG. 6 is a side view of the battery pack with a heat dissipation structure in accordance with the present invention.

It is to be noted that, referring to FIG. 6, the two battery modules 201, 202 of the battery pack are spaced by the spacing sleeves 40, avoiding the heat accumulation due to direct contact between the two battery modules 201, 202. In addition, the heat dissipation channel 60 formed between the two battery modules 201, 202 allows the hot air in the heat dissipation channel 60 to be smoothly exchanged with the cool air outside the battery pack, cooling down the temperature.

Figure 4:
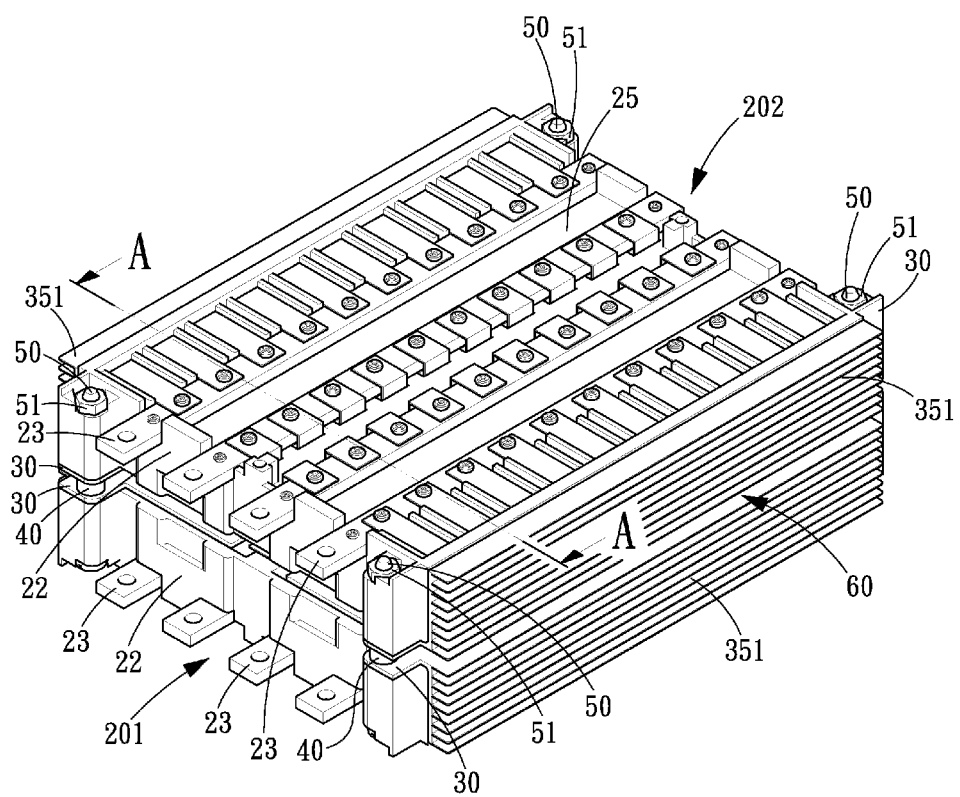
FIG. 4 is a combinational view of the battery pack with a heat dissipation structure in accordance with the present invention.
Figure 5:
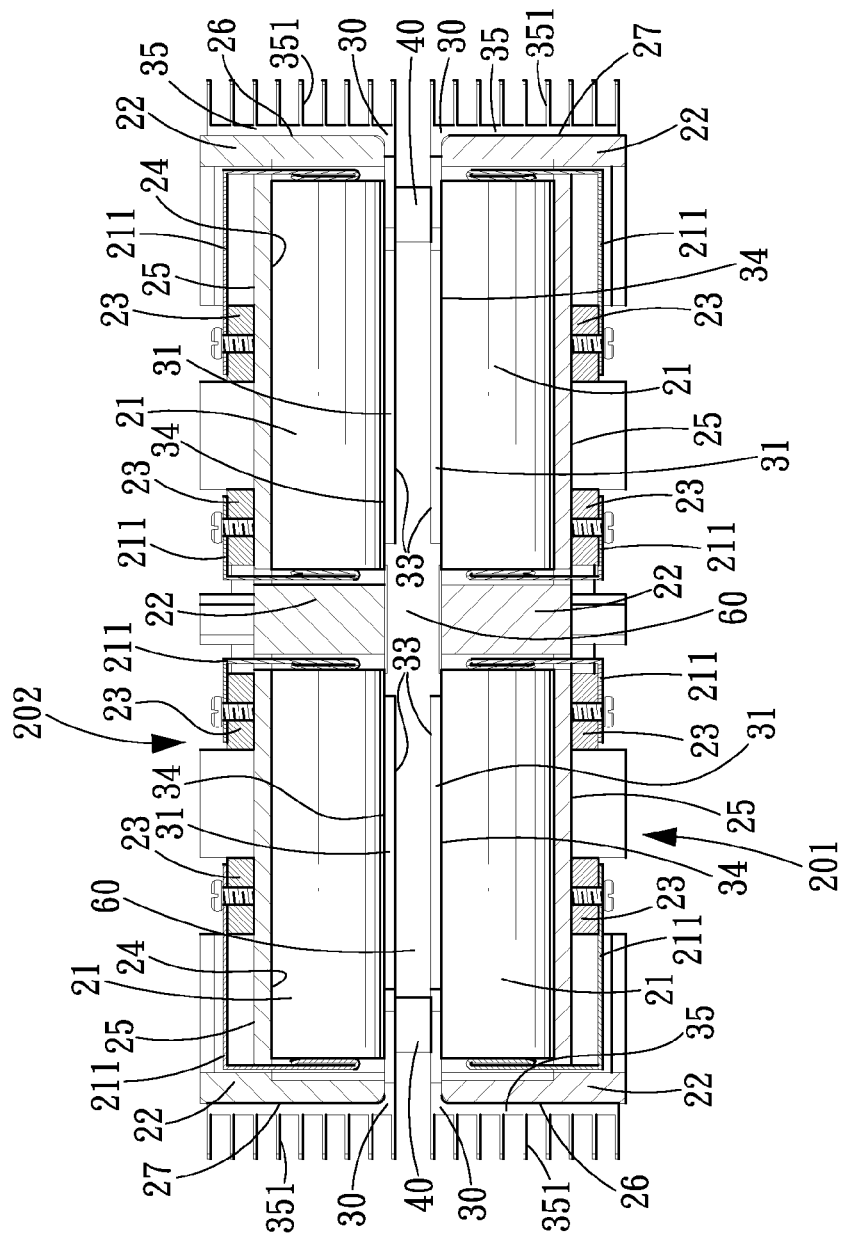
FIG. 5 is a cross-sectional view of FIG. 3 along the line A-A.

Furthermore, referring to FIGS. 4-5, the heat dissipation fins 351 of the battery pack are collectively disposed on the left surfaces 26 and the right surfaces 27, which not only avoids the heat accumulation in the inner surface 24 but also facilitates the space arrangement of the battery pack when in use, for example, the heat dissipation fins 351 can be arranged toward a place with better ventilation.

Figure 7:
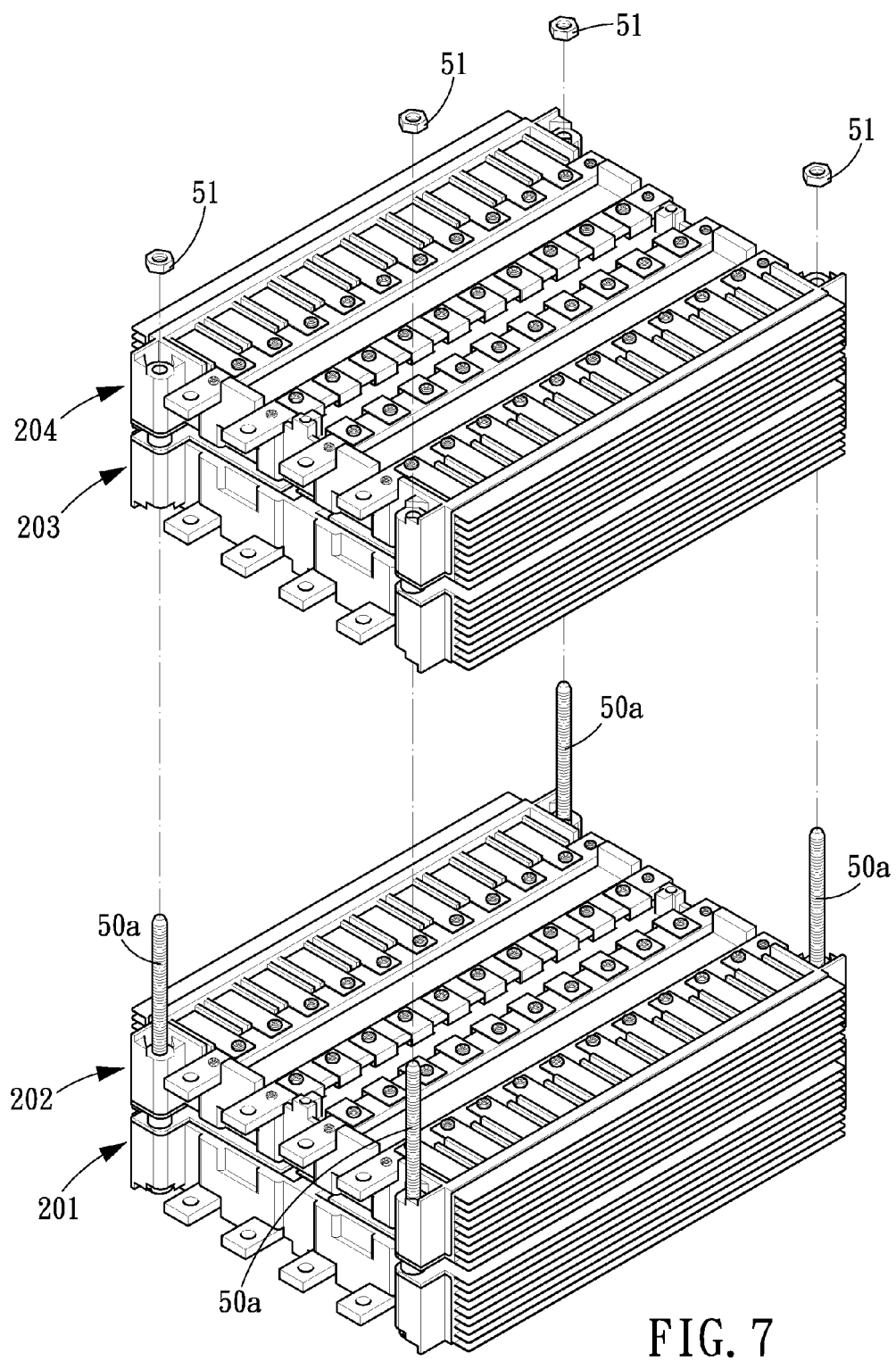
FIG. 7 is a schematic view showing how the battery pack with a heat dissipation structure in accordance with the present invention is additionally provided with another two battery modules.

It is to be mentioned that, the battery pack of the present invention is formed by assembling two battery modules 201, 202 one upon another by screws, referring to FIG. 7, another two battery modules 203, 204 are additionally disposed at one side of a combination of the two battery modules 201, 202. At this moment, the four battery modules 201, 202, 203, 204 can be assembled by extra long screws 50a, in other words, the structure of the present invention is easy to extend.

While we have shown and described various embodiments in accordance with the present invention, it is clear to those skilled in the art that further embodiments may be made without departing from the scope of the present invention.

What is claimed is:

1. A battery pack with a heat dissipation structure comprising:
    at least two battery modules each including plural battery cells that are electrically connected in a rectangular frame, the frame including an inner surface, an outer surface, a left surface and a right surface, each of the battery cells having a side surface exposed out of the inner surface of the frame, the frame being further formed with a through hole in each of four corners thereof;
    at least four heat dissipation elements disposed between the battery modules and each being provided with a plane plate, the plane plate being provided with a locking hole at each of two opposite ends thereof;
    at least four screws being inserted through the through holes of a first of the at least two battery modules, the locking holes of the heat dissipation element, and the through holes of a second of the at least two battery modules in order and then screwed with nuts;

the battery pack being characterized in that:

the plane plate of each of the heat dissipation elements includes a channel surface and a contact surface that are opposite each other, the contact surface is provided with a heat dissipation plate which is perpendicular to the contact surface, the heat dissipation plate is formed with plural spaced fins on an outer surface thereof, the contact surface of each of the heat dissipation elements is brought into contact with the side surfaces of the battery cells exposed out of the inner surface of the frame, so that the heat dissipation plates are positioned against the left side surfaces or the right side surfaces of the battery modules, and each of the battery modules is brought into contact with two of the at least four heat dissipation elements simultaneously, between each of the locking holes of the first of the at least two battery modules and a corresponding one of the locking holes of the second of the at least two battery modules is disposed a spacing sleeve which is sleeved onto the screws, namely, the spacing sleeves are located between the channel surfaces of the heat dissipation elements, so that the first of the at least two battery modules and two of the battery heat dissipation elements that are brought into contact with the first of the at least two battery modules are spaced a distance from the second of the at least two battery modules and another two of the battery heat dissipation elements that are brought into contact with the second of the at least two battery modules, and the distance forms a heat dissipation channel between the at least two battery modules, so that heat generated by the battery cells of the respective battery modules is allowed to be dissipated into the heat dissipation channel by the heat dissipation elements or dissipated outside the at least two battery modules by the fins of the heat dissipation plate.

\* \* \* \* \*